(No Model.)
C. M. RICHMOND.
ARTIFICIAL DENTURE.
No. 277,939. Patented May 22, 1883.
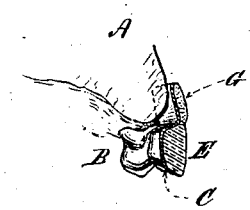
Fig. 1.
Fig. 2.
Fig. 3.
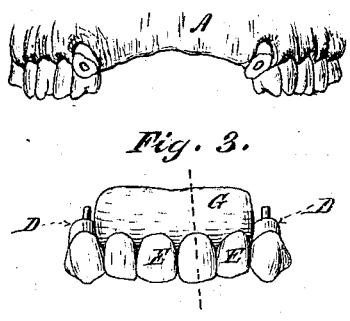
Fig. 4.
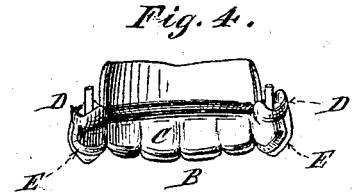
Witnesses:
Geo. H. Evans
A. Gref jr
Inventor:
Cassius M. Richmond
By his attorney,
E N Dickerson

UNITED STATES PATENT OFFICE.

CASSIUS M. RICHMOND, OF NEW YORK, N. Y., ASSIGNOR TO THE RICHMOND TOOTH CROWN COMPANY, OF SAME PLACE.

ARTIFICIAL DENTURE.

SPECIFICATION forming part of Letters Patent No. 277,939, dated May 22, 1883.

Application filed December 1, 1882. (No model.)

*To all whom it may concern:*

Be it known that I, CASSIUS M. RICHMOND, of the city, county, and State of New York, have invented a new and useful Improvement in Artificial Dentures, of which the following is a full, true, and exact description, reference being had to the accompanying drawings.

This invention relates to an improvement on the method of applying artificial dentures for which application for Letters Patent of the United States has heretofore been made by Alvan S. Richmond on the 9th day of August, 1882. In that application a method was shown of supporting artificial teeth above the gums alone by means of a bridge extending between properly-prepared roots. In cases of this kind it frequently occurs that the gum between said roots from which the teeth have been extracted has shrunk away from its natural position, and therefore, if the bridge be constructed as shown in said application, there will be a space between the gum and the bridge presenting an unsightly appearance. In order to avoid this difficulty, I proceed as follows: Having properly prepared the roots, I then prepare the bridge and teeth in the manner described in my previous application, with the exception that I prefer to make the backing both of the artificial crowns and of the artificial gum, to be described, of a continuous plate of platinum. This platinum is to be soldered to the backs of the porcelain teeth, preferably by pure gold solder, and then upon the face of this is to be applied a continuous gum, preferably of porcelain. I shall not particularly describe the method of attaching such artificial gum to metal, the same being well known in the art. Instead of porcelain, in certain cases I may use hard rubber or celluloid; but I prefer the porcelain.

My invention will be clearly understood from the accompanying drawings, in which Figure 1 represents a section through my artificial denture and the gum; Fig. 2, a front view of the prepared jaw before the bridge is applied; Fig. 3, a front view of the bridge and artificial gum; Fig. 4, a back view of the same.

A represents the natural gum; B, the artificial denture. C shows the continuous metallic backing, preferably of platinum, attached to suitable sockets, D, in the manner referred to in my previous application. E represents the artificial porcelain teeth, and G the artificial gum, of porcelain or other suitable material. This artificial gum, as will be seen, is supported upon platinum backing C, and when in position overlaps the natural gum, as shown in Fig. 1.

I shall not fully describe the method of preparation of the bridge and of the porcelain gum, the same being known in the art.

What I claim as my invention, and desire to secure by Letters Patent, is—

The combination of the metallic bridge C, provided with sockets or holding devices D and extending between its supports, and free from contact with the gum, with the artificial tooth E and the artificial gum G, extending above the bridge and covering the space between the latter and the natural gum, substantially as shown and described.

C. M. RICHMOND.

Witnesses:
GEO. H. EVANS,
ANTHONY GREF, Jr.